United States Patent
Oberschachtsiek et al.

(10) Patent No.: US 10,424,128 B2
(45) Date of Patent: Sep. 24, 2019

(54) SYSTEM AND METHOD FOR CONTROLLING VEHICLE DATA

(71) Applicant: VOLKSWAGEN AG, Wolfsburg (DE)

(72) Inventors: André Oberschachtsiek, Braunschweig (DE); Florian Pflug, Braunschweig (DE); Hendrik Decke, Braunschweig (DE)

(73) Assignee: Volkswagen AG (DE)

(*) Notice: Subject to any disclaimer, the term of this patent is extended or adjusted under 35 U.S.C. 154(b) by 399 days.

(21) Appl. No.: 15/288,083

(22) Filed: Oct. 7, 2016

(65) Prior Publication Data

US 2017/0103587 A1 Apr. 13, 2017

(30) Foreign Application Priority Data

Oct. 13, 2015 (DE) ......................... 10 2015 219 783

(51) Int. Cl.
G07C 5/00 (2006.01)
H04W 4/04 (2009.01)
H04W 12/02 (2009.01)
H04W 4/021 (2018.01)
H04W 4/18 (2009.01)
H04W 4/38 (2018.01)
H04W 4/44 (2018.01)

(52) U.S. Cl.
CPC .............. *G07C 5/008* (2013.01); *H04W 4/04* (2013.01); *H04W 4/046* (2013.01); *H04W 12/02* (2013.01); *H04W 4/021* (2013.01); *H04W 4/18* (2013.01); *H04W 4/38* (2018.02); *H04W 4/44* (2018.02)

(58) Field of Classification Search
CPC ........ G07C 5/008; H04W 4/046; H04W 4/04; H04W 4/44; H04W 4/18; H04W 4/021; H04W 4/38
See application file for complete search history.

(56) References Cited

U.S. PATENT DOCUMENTS

| | | | |
|---|---|---|---|
| 2013/0116917 A1 | 5/2013 | Boehm | |
| 2013/0117857 A1 | 5/2013 | Zimmermann | |
| 2014/0358394 A1 | 12/2014 | Picciotti | |
| 2015/0142253 A1* | 5/2015 | Nolting | G07C 5/0841 |
| | | | 701/29.6 |

FOREIGN PATENT DOCUMENTS

| | | |
|---|---|---|
| DE | 102011106295 A1 | 1/2012 |
| DE | 202013002107 U1 | 6/2013 |
| DE | 102012014362 A1 | 1/2014 |
| DE | 102012216666 A1 | 3/2014 |
| DE | 102014201662 A1 | 7/2015 |
| EP | 2736225 A1 | 5/2014 |

OTHER PUBLICATIONS

Machine Translation DE 10 2011 106295 published Jan. 2012.*
Search Report from German Patent Application No. 10 2015 219 783.2; dated Jun. 14, 2016.

* cited by examiner

*Primary Examiner* — Anne M Antonucci

(74) *Attorney, Agent, or Firm* — Barnes & Thornburg LLP

(57) ABSTRACT

A method for controlling data acquired from vehicles, wherein case data are anonymized and provides data reduction. Control exists between the units of each vehicle, between the vehicles and a backend of the system, between the units of the backend, and also between the units of the backend and at least one external service provider. The data are reduced by avoiding the transmission of redundant data or by avoiding unnecessary data acquisition.

22 Claims, 4 Drawing Sheets

SYSTEM AND METHOD FOR CONTROLLING VEHICLE DATA

PRIORITY CLAIM

This patent application claims priority to German Patent Application No. 10 2015 219 783.2, filed 13 Oct. 2015, the disclosure of which is incorporated herein by reference in its entirety.

SUMMARY

Illustrative embodiments relate to a method for controlling data acquired from a multiplicity of vehicles, in which case data are anonymized and provides data reduction. Control exists between the units (for example, applications, data receivers) of each vehicle, between the multiplicity of vehicles and a backend of the system, between the units of the backend and also possibly between the units of the backend and at least one external service provider. The data are reduced by avoiding the transmission of redundant data and/or by avoiding unnecessary data acquisition. Furthermore, improved accuracy of the acquired data is achieved. The data acquired in this case from a multiplicity of vehicles make it possible, for example, to provide third parties with the current weather and/or traffic flow information in connection with the specific position of each vehicle of the multiplicity of vehicles, in which case the data protection requirements (from the customer's point of view and/or legally) are ensured at the same time.

BRIEF DESCRIPTION OF THE DRAWINGS

Disclosed embodiments are explained by way of example below using the associated drawings, in which.

DETAILED DESCRIPTION

Figure 1:
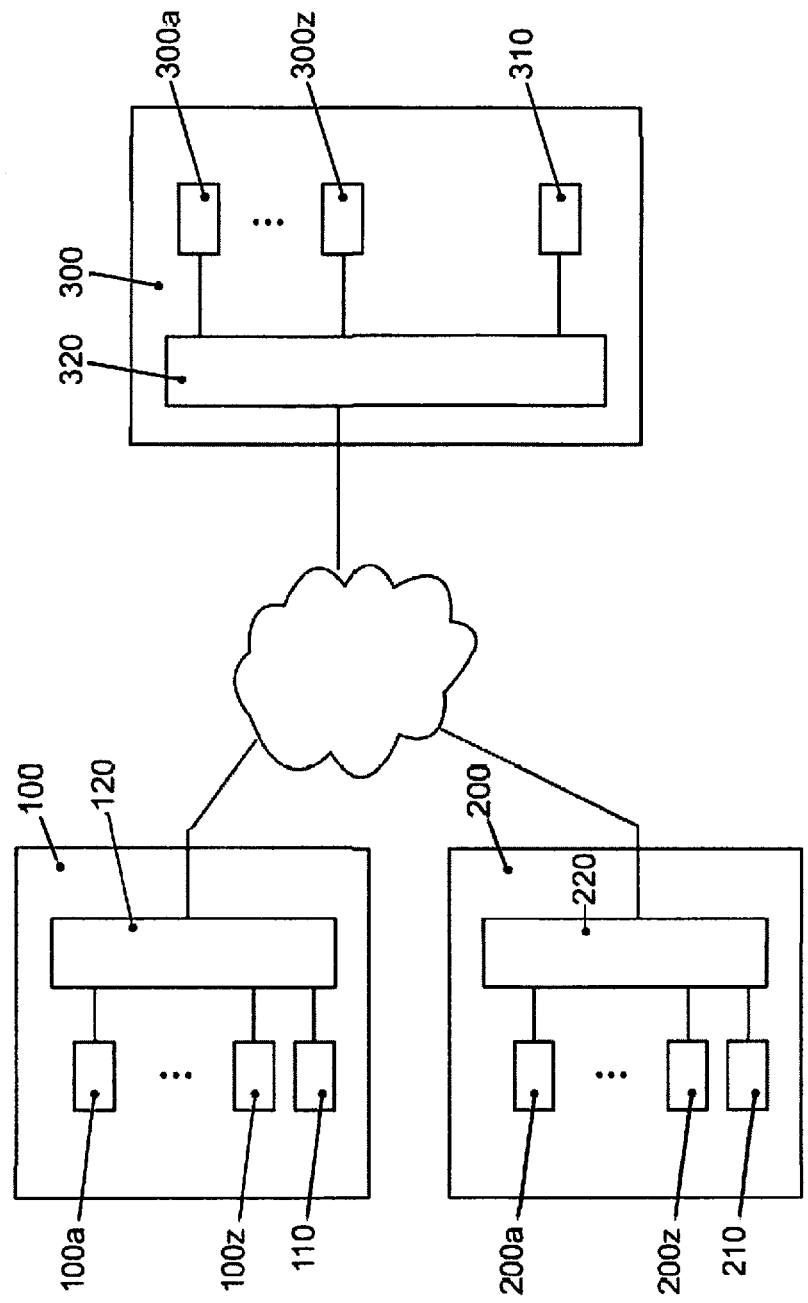
FIG. 1 shows a schematic view of a system used to transmit data between a multiplicity of vehicles and a backend sensor apparatus.

The prior art discloses solutions in which the data from a multiplicity of vehicles are delivered to a backend. The backend anonymizes the data before the backend provides third parties with the data. The data may contain measurements/values, for example, of the GPS position, the temperature values, rain values, light values which can be determined by a vehicle, which are acquired by means of devices or data recorders, these devices or data recorders being formed on each vehicle. The correct assignment of the data to a particular vehicle or to a particular location depends on the correct determination of the GPS position of the vehicle. Specific applications (services or apps) which use a specific type of data usually need to be implemented in the vehicle. This in turn means that each application (service or app) uses its own GPS position of the vehicle and transmits it together with the acquired data. Therefore, depending on tolerances and/or transmission errors and delays, a plurality of estimations of a GPS position for each application (service or app) could result for an individual vehicle. At best, this results in an identical GPS position being unnecessarily transmitted several times for each application (service or app) if all estimations (from each application—service or app) of an individual GPS position match.

It is also problematic, for example, that all services which require data from a multiplicity of vehicles do not require the same accuracy of data. Therefore, an unnecessary volume of data is normally transmitted. For example, if each service requires its own specific accuracy of a GPS position, different GPS positions may result in the case of applications (services or apps) in a vehicle even though an individual vehicle is involved. With regard to the use of the term "accuracy of the data", it should be noted that both the clock rate with which data are acquired (sampling time) and how accurately the data are required (for example, in view of a stated error tolerance, time tolerance, accuracy tolerance in the sense of decimal points, etc.) play a respective role for the accuracy of the data.

In contrast, the disclosed embodiments enable implementation of an efficient method for controlling data from a multiplicity of vehicles with regard to anonymization of the data and with regard to a reduction in the data to be transmitted between the units of each vehicle, between the multiplicity of vehicles and the backend of the system, between the units of the backend and between the units of the backend and possibly at least one external service provider. The repeated acquisition and transmission of repeatedly used data (for example, the GPS position of a vehicle) is avoided and the anonymization of the transmitted data is ensured in any case.

Both an individual accuracy requirement for the data to be transmitted and corresponding improved data management can be achieved using the disclosed embodiments. Therefore, the data to be transmitted are not transmitted with unnecessary accuracy for all applications (services or apps).

Disclosed embodiments provide an efficient method for controlling data from a multiplicity of vehicles to provide third parties with a further use of the data, if necessary in the case of third parties, in which case data anonymization must be ensured at the same time.

The technical problem is solved by the disclosed method.

The disclosed method for controlling data relating to a vehicle comprises a communication unit, a first data receiver, a second data receiver, a basic application and at least one data application, the vehicle being identified with an identification, comprises: requesting data from the at least one data application with regard to a specific position, acquiring basic data relating to the vehicle by means of the first data receiver, transmitting the basic data relating to the vehicle to the basic application, coding the identification of the vehicle, transmitting the basic data containing the coded identification of the vehicle to a basic service of a backend via the communication unit, acquiring the requested data by means of the second data receiver, transmitting the requested data to the at least one data application, allocating the at least one data application using an identifier, transmitting the requested data with the allocated identifier of the at least one data application to a first service via the communication unit, and is characterized in that the identifier of the at least one data application and the coded identification of the vehicle make it possible to anonymize the transmitting requested data.

The identification of the vehicle can be coded in the vehicle using its own processing unit. Alternatively or additionally, the vehicle can be coded outside the vehicle, for example, in a backend, the coded identification of the vehicle being transmitted to the vehicle after coding. The allocation of the at least one data application using an identifier can similarly be carried out in the vehicle. Alternatively or additionally, the at least one data application can be allocated outside the vehicle, for example, in a backend, the allocated identifier being transmitted to the data application after allocation.

In addition, the request for data from the at least one data application can be made from the basic service of the backend at the request of the first service, the request being able to comprise specifications for the accuracy and/or the transmission of the requested data and/or specifications for the accuracy and/or the transmission of the basic data, and the requested data and/or the basic data being able to be acquired and transmitted according to the requested specifications.

The first data receiver could be a GPS receiver, and the basic data could be GPS position data. Other types of data receivers, from which the position of a vehicle can be derived, are not excluded. It should be noted that the basic data mentioned should not only be limited to position data. In other words, further data, and not only position data, which need to be repeatedly transmitted from a plurality of applications in a vehicle, can be transmitted only once by the basic application in each vehicle. Data are therefore efficiently transmitted between a vehicle and the backend. The second data receiver could contain, for example, a temperature, rain or daylight sensor. Other types of data receivers are not excluded.

Furthermore, it is possible to determine, on the basis of the acquired basic data relating to the vehicle, that the vehicle is within a predefined region with respect to a specific position, data being able to be requested from the at least one data application only if it is determined, on the basis of the acquired basic data relating to the vehicle, that the vehicle is within the predefined region with respect to the specific position. In this sense, the request from an at least one data application is triggered only in connection with the specific (requested) position. The basic data relating to each vehicle can be stored in an assignment table which may be integrated in the basic service of the backend. Therefore, if information (weather, traffic flow, etc.) with regard to a specific position is required, a query (or a request) from the requester (for example, an external service) to the basic service of the backend is sufficient to determine which vehicles are within a predefined region to receive the required information. The predefined region can be set by the requester himself and/or by the basic service of the backend (depending on the number and/or availability of registered vehicles and/or registered services or apps, for example).

This avoids unnecessary data transmissions between a data application in the vehicle and the backend if a vehicle is not in a particular position. The position of each vehicle can be determined by periodically querying the backend for each registered vehicle and/or by querying the backend at the request of a service and/or by automatically transmitting the position data relating to the vehicle by means of the basic application in each vehicle if the vehicle has left a predefined region in comparison with the position data last transmitted to the backend. The position data relating to each vehicle can be stored in an assignment table. Alternatively or additionally, data may also be requested from the at least one data application in a vehicle irrespective of the position of the vehicle. Therefore, a requester can receive data relating to a vehicle irrespective of the position of the vehicle.

In a similar manner, basic data can be transmitted to the basic application in the vehicle only if it is determined, on the basis of the acquired basic data relating to the vehicle, that the vehicle is within the predefined region with respect to the specific position. Data are therefore efficiently transmitted inside the vehicle.

Data can likewise be acquired by means of the second data receiver only if it is determined, on the basis of the acquired basic data relating to the vehicle, that the vehicle is within the predefined region with respect to the specific position. Data are therefore efficiently acquired by the vehicle.

The method may comprise registering the at least one data application with the basic service of the backend, the requested data containing the allocated identifier of the at least one data application being transmitted to a first service via a communication unit only by means of the basic service of the backend. It is therefore possible to control the data in a centralized manner. In other words, the acquired data are made available to all other services or apps inside the backend itself or to other services or apps of external service providers—service providers outside the backend—only by the basic service of the backend. Alternatively or additionally, third parties (the external service providers mentioned above) can have direct access to the acquired data only if the acquired data have been adequately coded/encrypted in such a manner that the source of the data is protected.

Communication between a vehicle and the backend described above is carried out using a data infrastructure cloud, for example, the Internet, WLAN, Bluetooth and/or a mobile radio network. The vehicle is equipped with a corresponding communication unit (see 120, 220, . . . in FIG. 1) to allow the vehicle to communicate. The backend is accordingly equipped with a communication interface (see 320 in FIG. 1). In this context, at least one approval, authority, entitlement, authorization, authentication and/or encryption technology (for example, based on near-field communication (NFC), RFID, interchange of digital keys and/or certificates, PKI, PGP, etc.) can be used to improve the security of data transmissions between the units of the system shown.

Requested data can also be acquired periodically by means of the second data receiver described above and/or basic data can also be acquired periodically by means of the first data receiver described above. Data and/or basic data can therefore be acquired by a vehicle irrespective of an express request.

The requested data from the second data receiver can also be transmitted periodically to the at least one data application. Data can therefore be transmitted inside a vehicle irrespective of an express request. In this manner, the data application in the vehicle can be up-to-date and can provide the backend with current data more quickly if an express request is made, for example.

The requested data (data from a data application and/or basic data from a basic application) relating to a vehicle can be transmitted to the backend periodically. Data and/or basic data relating to a vehicle can therefore be transmitted irrespective of an express request. In this manner, a backend can be up-to-date and can provide third parties (for example, external service providers) with current data more quickly.

In other words, transmission and acquisition rates can be set independently according to the respective requirement and/or on account of great communication restrictions.

Furthermore, the data from a multiplicity of vehicles can be similarly controlled in the same manner, each vehicle from the multiplicity of vehicles comprising at least one communication unit, a first data receiver, a second data receiver, a data application and a basic application.

Figure 4:
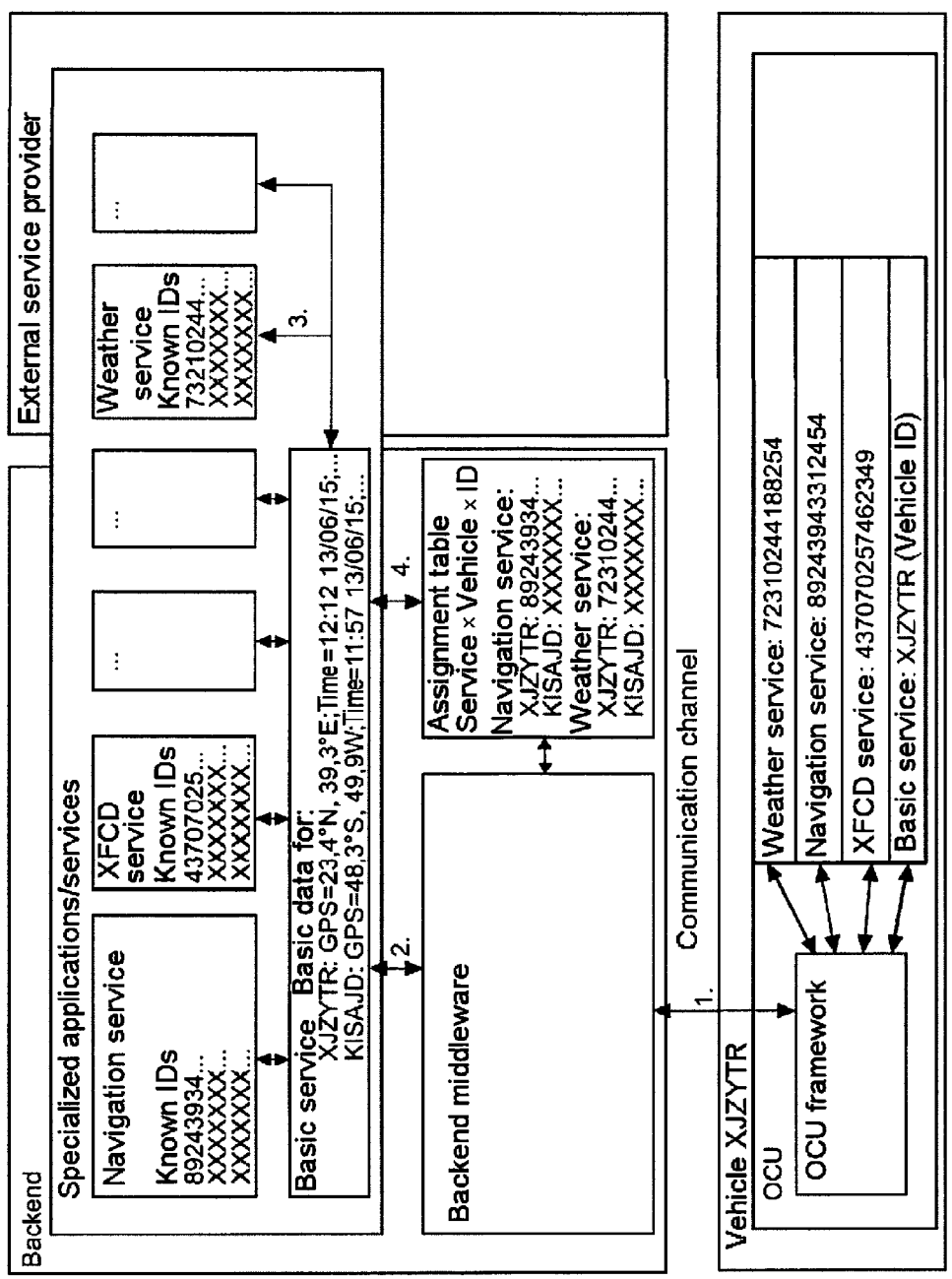
FIG. 4 shows a schematic view of the disclosed system.

Registering a specific vehicle (from a multiplicity of vehicles) with the backend comprises assigning/allocating a unique identification (ID) for the specific vehicle (for example, see FIG. 4 ID: XJZYTR for a first vehicle).

Registering a data application (in a specific vehicle) with the backend comprises assigning/allocating a unique identifier for the application (for example, see FIG. 4 weather service ID: 72310244188254 for the weather service application).

It should be noted that the terms "application", "service" and "app" should be considered to be equivalents. They are generally known terms for describing installed software in a system. A service can be considered to be an application or app, in which case the service does not run in the foreground.

Further configurations are explained in more detail below using the exemplary embodiments illustrated in the drawings, but the configurations are generally not restricted overall to the exemplary embodiments.

FIG. 1 shows a schematic view of a system which is used to transmit data between a multiplicity of vehicles (only a first vehicle 100 and a second vehicle 200 are shown, for example) and a backend sensor apparatus 300, called backend 300 below. Data can be understood as meaning data on the vehicle side and data on the backend side. Vehicle data or data from the vehicle 100, for example, can be understood as meaning, for example, GPS, temperature, rain or daylight values which are included with the vehicle 100.

The disclosed system has a backend 300, the backend 300 comprising a communication unit 320, a multiplicity of services 300a to 300z and a basic service 310.

Figure 2:
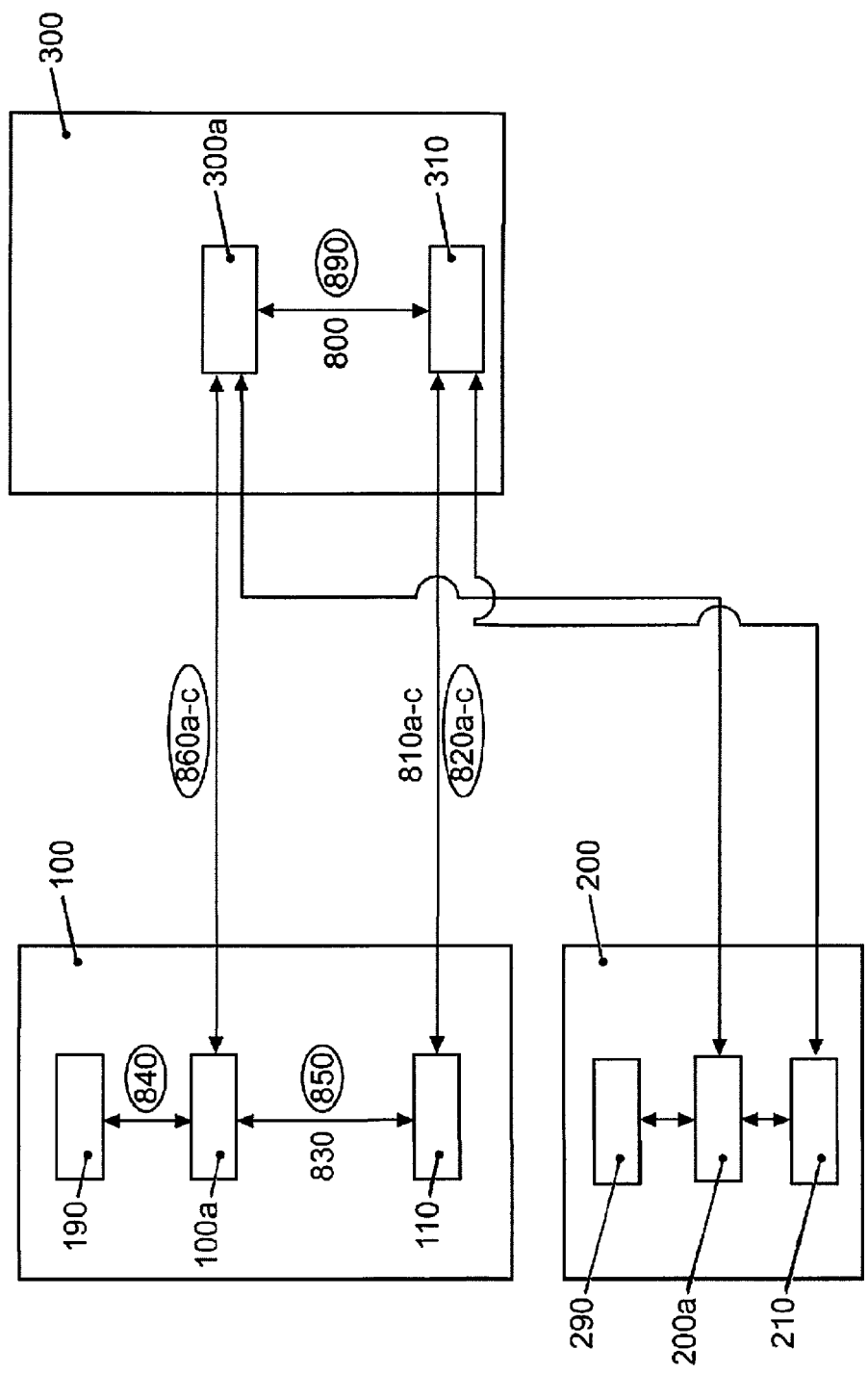
FIG. 2 shows a schematic view of the transmission of data between two vehicles and a backend, where the efficient data transmission operations are marked with a circle.

It should be noted that the at least first data receiver and at least second data receiver 190, 290, etc. in each vehicle are not shown in FIG. 1 for reasons of clarity (but are shown in FIG. 2).

FIG. 2 shows a schematic view of the transmission of data (on the vehicle side and on the backend side) between two vehicles 100, 200 and a backend 300, where the efficient data transmission operations are marked with a circle (see 840, 850, 860a-c, 820a-c and 890). It should be noted that the respective communication units 120, 220, 320, etc. are not shown in FIG. 2 for reasons of clarity (but are shown in FIG. 1). It should also be noted that the service 300a illustrated in the backend can also be implemented in an external service provider and can access the data relating to the multiplicity of vehicles.

Every application in every vehicle could be directly registered with a corresponding service of the backend and/or an external service provider to enable coupling to a corresponding service. Alternatively or additionally, every application in every vehicle could be registered with the basic service of the backend. A registration method is therefore centralized.

As illustrated in a simplified manner in FIG. 2, direct communication (data request and transmission) for the specific data from a data application (except for the position data relating to the respective vehicle) takes place between the weather application 100a, 200a in each vehicle and the weather service 300a which requires or has requested the weather data (see operation 860a-c). Direct communication (data request and transmission) for at least the position data relating to the respective vehicle also takes place between the basic application 110, 210 in each vehicle and the basic service 310 of the backend 300 (see operation 820a-c).

Figure 3:
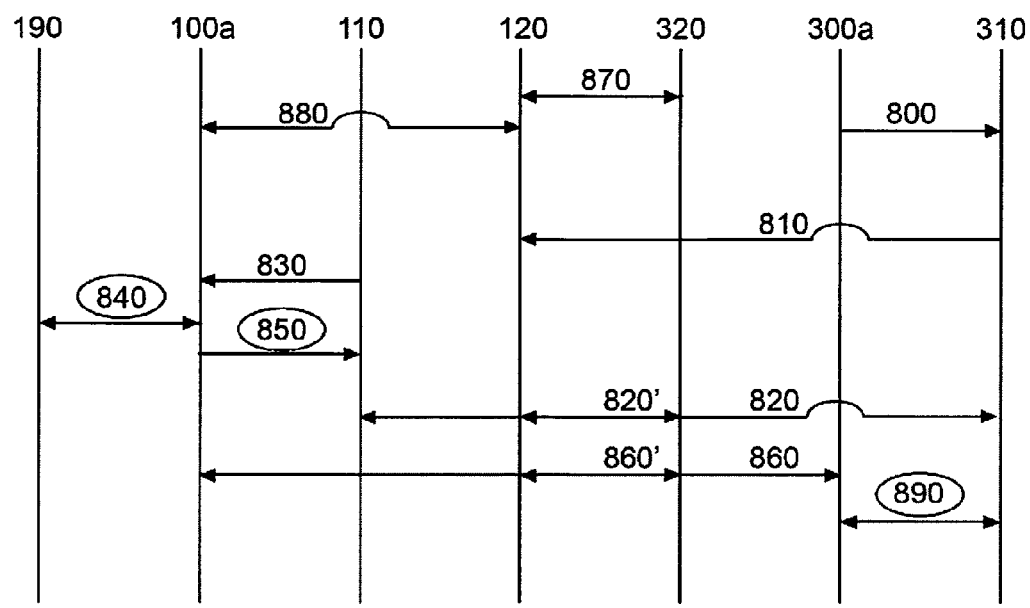
FIG. 3 shows a schematic flowchart for the acquisition and transmission of data.

FIG. 3 shows a schematic flowchart for the acquisition and transmission of data. With reference to FIG. 3, a weather service 300a (which can be integrated in the backend 300 shown in FIG. 2 and/or in an external service provider), for example, initiates 800 a request for data from the basic service 310 of the backend 300. Provided that they have been registered with/coupled to one another, a weather service 300a could also communicate directly with a data application in a vehicle.

At least one vehicle can be registered directly with the external service provider, for example, in such a manner that the request from the external service provider for data is transmitted directly from the at least one vehicle (or from its registered applications). In any case, specific requirements for the accuracy of the data to be recorded, for example, the accuracy (namely the time tolerance and interval between data recording operations, the time tolerance and interval between transmitting data from different applications/vehicles, decimal points, etc.) of the GPS position, the temperature, rain and/or daylight values, can be stated as part of the request.

In response to this request 800, the basic service 310 of the backend 300 processes this request and forwards 810 a processed request from the respective basic application 110, 210, etc. in the respective vehicle whose respective weather apps have been registered with the backend 300.

Registration between the corresponding applications (for example, weather app 100a, traffic information app 100z) comprises allocating/assigning a unique identifier for the specific service or app and assigning/allocating a unique identification (ID) for the specific vehicle. The generation of a unique identification (ID) can be generated for each vehicle by a random number generator, for example, on the basis of the vehicle identification number (VIN). This registration operation can be carried out at the start of the method (as illustrated in FIG. 3 as 870 and 880) or, for example, after the above-mentioned request for data 800 or after the above-mentioned forwarding of the request for data 810. Other sequences are not excluded.

It should be noted that all possible internal communication inside the backend 300, namely between the units 320, 300a and 310, is not shown for reasons of clarity.

According to this request for data, the respective basic application in each registered vehicle will request 830 the GPS position and the requested data (for example, temperature, rain and/or daylight values) from the corresponding data applications which are registered and available in each vehicle. The corresponding data applications will further request 840 the requested data from the corresponding data recorders/data receivers 190 formed in each vehicle. Alternatively or additionally, the respective basic application can request the GPS position and the requested data (for example, temperature, rain and/or daylight values) directly from the corresponding data recorders/data receivers 190 (not shown for reasons of clarity). These data recorders/data receivers 190 may contain a temperature, rain or daylight sensor, for example. Other types of data recorder/data receiver are not excluded. The above-described request for data 800 may trigger an independently periodic request for data 830 and/or both requests 800 and 830 may be coupled.

Data and requests can be transmitted periodically between the data recorders/data receiver (for example, temperature sensor 190) and the data applications (for example, weather app 100a) and between the basic application (for example, 110) and the data applications (for example, weather app 100a) or between the basic application (for example, 110) and the data recorders/data receiver (for example, temperature sensor 190) and/or depending on the stated specifications in the above-mentioned request 800 from the weather service 300a. In other words, periodically or as required by the service which has requested the data and/or as required by other involved units in the system shown, for example, on account of communication restrictions. In other words, the backend, an external service provider and/or a specific service itself of the backend and/or of an external service provider report(s) the requirement (for example, on account of network availability and restrictions) regarding which data are required and how often. This requirement could be set/adapted by the backend, the external service provider and/or the specific service itself. This avoids an unnecessarily fast data recording cycle, for example. Consequently, unnecessary transmission of data is effectively reduced. Alternatively or additionally, all transmissions of data and requests can be effected with an identical adjustable time pattern for all services. This adjustment could be controlled by the backend, the external service provider and/or the specific service itself.

After the respective basic application in each vehicle has received the requested data, the respective basic application in each vehicle transmits the GPS position with further meta information, for example, a first time stamp, to the basic service 310 of the backend 300, see operation 820. As a result, a unit (which can be integrated in the backend), for example, can assign each vehicle to a specific position with an adjustable position tolerance and range by evaluating the stated GPS position.

After the respective data application (service or app), for example, weather app 100*a*, in each vehicle has received the requested data (from at least one data recorder), the respective data application transmits the acquired data with further meta information, for example, a second time stamp, and/or with the allocated identifier of the application to the weather service 300*a* (the service which has requested the data), for example, see operation 860. Alternatively or additionally, registered services may receive data even though they have not expressly requested the data (for example, if important information such as storms, drivers traveling in the wrong direction and/or a serious accident should be disseminated). Since the corresponding GPS position is transmitted by means of the basic application in the respective vehicle, transmission of the GPS position for each application is effectively avoided. The anonymization of the data is ensured by the allocated identifier of the data application. In any case, a unit (which may be integrated in the backend) can assign each vehicle by evaluating the respective stated identification (ID) of the vehicle and the identifier of the data application and/or by evaluating the meta information which has been interchanged. Alternatively or additionally, the allocated identifier of a data application can be derived from the stated identification (ID) of the vehicle or vice versa in such a manner that it is possible to assign the existing services or apps in a particular vehicle. Alternatively or additionally, the existing services or apps in a particular vehicle can be assigned by transmitting additional parameters as further meta information and/or by evaluating a probability on the basis of the above-mentioned first and second time stamps (for example, if both time stamps are within a particular adjustable interval of time) in such a manner that a particular identifier can be assigned to a particular service or app in a particular vehicle.

Anonymization of the data is ensured by allocating a unique identifier for each data application. The backend can keep track of the data and the source of the data (which vehicle and/or which data application in a vehicle) using a first assignment table, for example, which can be integrated in the basic service of the backend.

The backend can keep track of these transmitting data and can possibly correlate them using the above-described first and second time stamps and using, for example, a second assignment table which can be integrated in the basic service of the backend. This can be carried out by defining a particular adjustable time tolerance or interval between the first and second time stamps. Therefore, a particular identifier can also be assigned to a particular service or app in a particular vehicle.

Alternatively or additionally, the first and second above-mentioned assignment tables may be combined in a single table.

Alternatively or additionally, the identification of the respective vehicle or the coded identification of the respective vehicle can in each transmission from the basic application together with the GPS position. In a similar manner, the identification of the respective vehicle or the coded identification of the respective vehicle can be transmitted in each transmission from the respective data application together with the requested data, the identifier and the second time stamp.

In addition, improved transmission of the GPS position data and of the vehicle data (the above-mentioned data which are acquired using the at least second data receiver) between a weather map service (300*a*) and the basic service/app (310) of the backend 300, for example, is also carried out (operation 890) according to requirements, specifications and/or settings. Each registered service 300*a*-300*z* (which can be implemented in the backend 300 itself and/or in at least one external service provider) receives the position data, which determine the individual specific position of a vehicle, only once by means of the basic service/app (310) of the backend 300.

FIG. 4 shows a schematic view of the disclosed system. Data are efficiently transmitted between a multiplicity of vehicles (only a first vehicle is shown, for example) and a backend via at least one data infrastructure cloud.

As shown, a weather service (see FIG. 4, ID 73210244xxx) of an external service provider and/or of the backend itself, for example, can access the so-called basic data (for example, GPS position data relating to a vehicle), these basic data being anonymized by means of the assigned/allocated coded identification (ID) of the vehicle. Furthermore, the respective (registered) data applications (services or apps) in each vehicle (which are anonymized by means of the assigned/allocated identifier) and the vehicle itself can be kept track of only by means of the assignment table shown.

Each vehicle is registered with a unique coded identification (ID) (for example, "XJZYTR" for a first vehicle). Each service or app in each vehicle is registered with a unique identifier (see, for example, "72310244188254" for a weather service ID in the first vehicle with ID "XJZYTR"). As illustrated, all services or apps in each vehicle (apart from the basic service or basic app of the vehicle) are registered with an identifier which cannot be correlated with the identification (ID) of the vehicle. Alternatively or additionally, the identifiers of the existing services or apps in a vehicle could nevertheless be correlated by coding/processing the identification (ID) of the vehicle, provided that only the backend can keep track of this coding/processing.

At least an assignment table is provided in the backend. This assignment table could be integrated in the basic service of the backend. The assignment table shown can link the multiplicity of vehicles and the existing services or apps in each vehicle to one another. This assignment of existing services or apps for each vehicle is known—in addition to the vehicle itself—only in the backend. In this manner, a type of virtual vehicle can be seen in the assignment table, in which case anonymization with respect to third parties is ensured in any case.

The backend can contain services or apps (for example, navigation service, weather service, etc.) which request data from the multiplicity of vehicles and provide external service providers with the data. Data are requested by a provided basic service or app which is integrated in the backend, the basic service containing the assignment table described above and/or the basic service having access to the assignment table described above. For each service or app (of the backend and/or of an external service provider) which requires data from a multiplicity of vehicles, the identifiers of existing services or apps in a multiplicity of vehicles are known after successful registration. Specific data from each data application (for example, temperature, rain and/or light values) in each vehicle, apart from the position data relating to the vehicle, can be requested from the services or apps in each vehicle (not shown) only using the provided basic service or app (which is integrated in the backend) by means of the allocated identifiers and can be received in such a manner that the source (which vehicle) of the data remains anonymous. Alternatively or additionally, a service of an external service provider can communicate directly with the basic service or app provided in the backend. In this manner, the specific data relating to the vehicle can be requested and transmitted directly between each service or app and the basic application and/or data application in each vehicle provided that the data are anonymized before they are transmitted.

A service or app of the backend and/or of an external service provider can access the position data relating to a specific vehicle only using the provided basic service or app integrated in the backend. The request from the provided basic service or app integrated in the backend is made by using the identifier of a data application. As a result, the provided basic service or app integrated in the backend can use the assignment table to send the corresponding position data relating to the specific vehicle whose data application is registered with the stated identifier. Alternatively or additionally, the request from the provided basic service or app integrated in the backend can be made by using the identification (ID) of the specific vehicle. This presupposes that each service also receives the identification (ID) of each vehicle together with the requested data. In any case, the source of the data (that is to say the respective vehicle) remains anonymous.

The position data relating to each vehicle can be transmitted by the basic service or app in each vehicle to the basic service or app in the backend. In this manner, the position data relating to a vehicle are not transmitted by each service or app in the vehicle, but rather are transmitted only once by the basic service or app in the vehicle. This makes it possible, on the one hand, to improve the assignment of the data—only a particular set of position data for each specific vehicle with a predefined accuracy is sent—and, on the other hand, to efficiently transmit data—each service or app in a vehicle sends only data which are specifically included in the service or app, such as temperature, rain and/or light values for a weather app, for example. In contrast, the transmission of the position data relating to the vehicle for each service or app in the vehicle is redundant and is intended to be avoided.

Data protection and data economy are ensured irrespective of the increasing number of applications, services and apps.

It should be noted that the operations shown in the above-mentioned figures are used only for illustration purposes and that the operations shown in the above-mentioned figures can be carried out at the same time or in a sequence other than that shown.

In addition, it is clear to a person skilled in the art that a plurality of implementations and embodiments, other than the embodiments described above, fall under the scope of protection of the accompanying patent claims.

LIST OF REFERENCE SYMBOLS

190 Data receiver: for example, light sensor, rain sensor, GPS receiver
100 Vehicle 1
100a Weather app/service
100z Traffic information app/service
110 Basic service/app in the vehicle 100
120 Communication interface in the vehicle 100
300 Backend
300a Weather map service
300z Traffic information service
310 Basic service/app in the backend 300
320 Communication interface in the backend
200 Vehicle 2
200a Weather app/service
200z Traffic information app/service
210 Basic service/app in the vehicle 200
220 Communication interface in the vehicle 200

The invention claimed is:

1. A method for controlling data relating to a transportation vehicle to anonymize transmission of requested transportation vehicle data, wherein the transportation vehicle includes a communication unit, a first data receiver, a second data receiver, a basic application and at least one data application, and wherein the transportation vehicle is identified with an identification, the method comprising:
   requesting data from the at least one data application of the transportation vehicle with regard to a specific geographic position for the transportation vehicle;
   acquiring basic data relating to the transportation vehicle by the first data receiver of the transportation vehicle;
   transmitting the basic data relating to the transportation vehicle to the basic application of the transportation vehicle;
   coding the identification of the transportation vehicle;
   transmitting the basic data containing the coded identification of the transportation vehicle to a basic service of a backend via the communication unit of the transportation vehicle;
   acquiring the requested data by the second data receiver of the transportation vehicle;
   transmitting the requested data to the at least one data application of the transportation vehicle;
   allocating, by the at least one data application of the transportation vehicle, an identifier to the requested data; and
   transmitting the requested data with the allocated identifier to a first service via the communication unit of the transportation vehicle,
   wherein the allocated identifier of the requested data allocated by the at least one data application of the transportation vehicle and the coded identification of the transportation vehicle enable anonymizing the transmission of the requested data from the at least one data application of the transportation vehicle.

2. The method of claim 1, wherein the request for data from the at least one data application is made from the basic service of the backend at the request of the first service, and the request comprises at least one of specifications for at least one of accuracy or the transmission of the requested data or specifications for at least one of accuracy or the transmission of the basic data, and at least one of the requested data or the basic data being acquired or transmitted according to the requested specifications.

3. The method of claim 1, wherein the first data receiver is a GPS receiver, and the basic data is transportation vehicle position data, and the method further comprises:
   determining, based on the acquired basic data relating to the transportation vehicle, whether the transportation vehicle is within a predefined region with respect to the specific geographic position; and
   requesting data from the at least one data application is performed only in response to determining, based on the acquired basic data relating to the transportation vehicle, that the transportation vehicle is within the predefined region with respect to the specific geographic position.

4. The method of claim 3, wherein basic data is transmitted to the basic application of the transportation vehicle only in response to a determination, based on the acquired basic data relating to the transportation vehicle, that the transportation vehicle is within the predefined region with respect to the specific geographic position.

5. The method of claim 3, wherein requested data is acquired by the second data receiver only in response to a determination, based on the acquired basic data relating to the transportation vehicle, that the transportation vehicle is within the predefined region with respect to the specific geographic position.

6. The method of claim 1, further comprising registering the at least one data application with the basic service of the backend, wherein the requested data containing the allocated identifier of the at least one data application is transmitted to a first service via a communication unit only by the basic service of the backend.

7. The method of claim 1, wherein requested data is acquired periodically by the second data receiver or basic data is acquired periodically by the first data receiver.

8. The method of claim 1, wherein the data from the second data receiver is transmitted periodically to the at least one data application or the basic data from the first data receiver is transmitted periodically to the basic application.

9. The method of claim 1, wherein the requested data relating to the transportation vehicle is transmitted periodically to the backend.

10. The method of claim 1, further comprising independently setting transmission and acquisition rates.

11. The method of claim 1, wherein data from a multiplicity of transportation vehicles is controlled, wherein each transportation vehicle from the multiplicity of transportation vehicles comprises at least one communication unit, a first data receiver, a second data receiver, a data application and a basic application.

12. The method of claim 11, further comprising registering a specific transportation vehicle of the multiplicity of transportation vehicles with the backend by assigning/allocating a unique identification for the specific transportation vehicle.

13. An on-vehicle configuration for controlling data relating to a transportation vehicle identified with an identification to anonymize transmission of requested transportation vehicle data, the on-vehicle configuration comprising:
   a communication unit;
   a first data receiver coupled to the communication and acquiring basic data related to the transportation vehicle;
   a second data receiver coupled to the communication unit;
   a basic application; and
   at least one data application,
   wherein the basic application requests data from the at least one data application with regard to a specific geographic position for the transportation vehicle,
   wherein the at least one data application transmits the basic data relating to the transportation vehicle to the basic application,
   wherein the identification of the transportation vehicle is coded by the communication unit, which then transmits the basic data containing the coded identification of the transportation vehicle to a basic service of a backend,
   wherein the second data receiver acquires the requested data,
   wherein the requested data is transmitted by the communication unit to the at least one data application, which then allocates an identifier for the requested data,
   wherein the requested data is transmitted with the allocated identifier to a first service via the communication unit such that the identifier of the at least one data application and the coded identification of the transportation vehicle enable anonymizing the transmission of the requested data.

14. The configuration of claim 13, wherein the request for data from the at least one data application is made from the basic service of the backend at the request of the first service, and the request comprises at least one of specifications for the accuracy or the transmission of the requested data or specifications for the accuracy or the transmission of the basic data, and the requested data or the basic data being acquired or transmitted according to the requested specifications.

15. The configuration of claim 13, wherein the first data receiver is a GPS receiver, wherein the basic data is transportation vehicle position data, wherein depending on the acquired basic data relating to the transportation vehicle, a determination is made whether the transportation vehicle is within a predefined region with respect to the specific geographic position, and the data is requested from the at least one data application only in response to a determination that the transportation vehicle is within the predefined region with respect to the specific geographic position.

16. The configuration of claim 15, wherein basic data is transmitted to the basic application of the transportation vehicle only in response to a determination, based on the acquired basic data relating to the transportation vehicle, that the transportation vehicle is within the predefined region with respect to the specific position.

17. The configuration of claim 15, wherein data is acquired by the second data receiver only in response to a determination, based on the acquired basic data relating to the transportation vehicle, that the transportation vehicle is within the predefined region with respect to the specific position.

18. The configuration of claim 13, the at least one data application is registered with the basic service of the backend, wherein the requested data containing the allocated identifier of the at least one data application is transmitted to a first service via a communication unit only by the basic service of the backend.

19. The configuration of claim 13, wherein requested data is acquired periodically by the second data receiver and/or basic data is acquired periodically by the first data receiver.

20. The configuration of claim 13, wherein the data from the second data receiver is transmitted periodically to the at least one data application and/or the basic data from the first data receiver is transmitted periodically to the basic application.

21. The configuration of claim 13, wherein the requested data relating to a transportation vehicle is transmitted periodically to the backend.

22. The configuration of claim 13, wherein data transmission and acquisition rates are set independently.

* * * * *